(12) United States Patent  (10) Patent No.: US 8,224,680 B2
Parisien et al.  (45) Date of Patent: Jul. 17, 2012

(54) SYSTEM AND METHOD FOR REAL TIME MAINTAINING AN INVENTORY OF SERVICES AND ASSOCIATED RESOURCES OF A CLIENT COMPANY

(75) Inventors: Vincent Parisien, Saint-Léonard (CA); Christopher Xavier Thierry, Île Perrot (CA)

(73) Assignee: Etelesolv.com Inc., Lachine (CA)

( * ) Notice: Subject to any disclaimer, the term of this patent is extended or adjusted under 35 U.S.C. 154(b) by 1112 days.

(21) Appl. No.: 11/867,657

(22) Filed: Oct. 4, 2007

(65) Prior Publication Data

US 2009/0094075 A1  Apr. 9, 2009

(51) Int. Cl.
*G06Q 10/00* (2012.01)
*G06F 17/60* (2006.01)

(52) U.S. Cl. .............................................. 705/7; 705/28
(58) Field of Classification Search ........................ 705/7
See application file for complete search history.

(56) References Cited

U.S. PATENT DOCUMENTS

| | | | |
|---|---|---|---|
| 5,884,284 A | 3/1999 | Peters et al. | |
| 5,920,846 A | 7/1999 | Storch et al. | |
| 6,032,132 A | 2/2000 | Nelson | |
| 6,535,593 B1 | 3/2003 | Cashiola | |
| 6,868,397 B1 * | 3/2005 | McCaslin | 705/28 |
| 6,891,937 B1 | 5/2005 | Kuhn et al. | |
| 6,937,993 B1 | 8/2005 | Gabbita et al. | |
| 7,065,496 B2 | 6/2006 | Subbloie et al. | |
| 7,130,399 B1 | 10/2006 | Jean et al. | |
| 7,167,550 B2 | 1/2007 | Klos et al. | |
| 2002/0077711 A1 * | 6/2002 | Nixon et al. | 700/51 |
| 2004/0002886 A1 | 1/2004 | Dickerson et al. | |
| 2004/0267586 A1 | 12/2004 | McDougal et al. | |
| 2006/0075102 A1 | 4/2006 | Cupit | |
| 2006/0160546 A1 | 7/2006 | Tang et al. | |
| 2006/0215557 A1 | 9/2006 | Corley et al. | |
| 2007/0038532 A1 | 2/2007 | Vyas | |
| 2007/0156476 A1 | 7/2007 | Koegler et al. | |

* cited by examiner

*Primary Examiner* — Garcia Ade
(74) *Attorney, Agent, or Firm* — Goudreau Gage Dubuc; Gonzalo Lavin

(57) ABSTRACT

A system for real-time maintaining an inventory of services and associated resources of a client company. A product component communicates with feeds receiving inventory data from the client company. A transactional component communicates with the product component for managing transactional records, processing responses related thereto and updating the inventory records accordingly. An expert engine component evaluates the transactional records against corresponding ones of the inventory records stored in the product component to identify eventual changes to be made to the inventory records as determined by set conditions, and controls generation of service orders articulated on action parameters of the transactions and the inventory records concerned by the transactions. A user interface capable of displaying selected inventory records, inputting transactions relative to the inventory records, and of inputting responses to the service orders placed by the expert engine component communicates with the product and transactional components.

19 Claims, 10 Drawing Sheets

SYSTEM AND METHOD FOR REAL TIME MAINTAINING AN INVENTORY OF SERVICES AND ASSOCIATED RESOURCES OF A CLIENT COMPANY

FIELD OF THE INVENTION

The present invention relates to a system and a computerized method for real-time maintaining an inventory of services and associated resources of a client company, such as telecom services and equipments used by employees of a company, or transportation services and a vehicle fleet of a transportation company, or other services, materials and human resources constituting assets of a company.

BACKGROUND

Telecom services are still evolving rapidly with today's fast changing business practices. Large corporations or companies such as banks, governments, power companies and even telecom companies have been slimmed down to the point that the telecom administrating people in such companies struggle to put out fires. The validating or optimization of phone plans is far down the list of priorities. Most IT departments of such corporations are focused on keeping the network up and running rather than eyeballing account irregularities. Telecom services are however notorious for changing without updating the inventory. In the era of the Sarbanes-Oxley Act (SOX) of 2002 in the USA and of its equivalent in Canada known as Bill 198, accuracy of the inventory of IT (Information Technology) and other assets of a company is highly important, especially from the financial viewpoint, but for many other reasons such as optimization of internal operations, equipment usage and human resources, in addition to billing charge verifications and audits.

Known in the art is U.S. Pat. No. 7,065,496 (Subbloie et al.), which discloses a process that calculates the variance between actual and targeted telecommunication performance metrics across multiple categories allowing a user to define variance tolerances and dictate appropriate responses including closed loop tracking resolution. The process is implemented through a system which manages service provider agreements in an agreements database accessible by a server. The agreements database stores contracted performance data. The system also has a user preferences database accessible by the server, a performance measurement module gathering actual performance data indicative of actual service performance, and a variance calculator determining agreement conformity status by determining whether the actual system performance indicated by the actual service performance data corresponds with the minimum service performance indicated by the contracted performance data within the maximum allowable deviance indicated by the user preference data.

The system does not use the inventory as the starting point for creating any service order. It appears that the user of such a system is required to write out a service order request and subsequently update the inventory manually, which proves the main reason why inventory tracking fails. Indeed, by having to word out a request in text format and subsequently update the inventory, the data becomes corrupted and inaccurate. Thus, a drawback of the system is that since the inventory needs to be manually updated by the user after the work is carried out, there are significant chances that data be misstyped or worse forgotten altogether. Moreover, the time required to manually enter the information into the system is done at high costs, thus depleting the client company of her valuable resources.

U.S. Pat. No. 5,920,846 (Storch et al.) teaches a system and a method mainly directed to simplify the processing, management and tracking of service requests for installation, maintenance or repair works related to telecom services provided to customer premises. U.S. Pat. No. 6,868,397 (McCaslin) teaches a system and a method allowing equipment inventory to be tracked, monitored and evaluated, in particular for shipping or transportation purposes. U.S. Pat. No. 6,891,937 (Kuhn et al.) teaches a system designed to compile and manage telecom service data from different telecom service providers especially intended to users such as customers or operators. The system also provides reminder management for example for watching service and billing plan change deadlines. U.S. Pat. No. 6,937,993 (Gabbita et al.) teaches a workflow management system for tracking and processing telecom service orders, which centralizes order processing and tracking operations in a conventional type of telecom service system including multiple sub-systems performing specialized tasks. Providers for the service order receive work orders generated by the system in their e-mal in-box applications. U.S. Pat. No. 7,130,399 (Jean et al.) teaches a system for assembling a more accurate line record for a customer based on information acquired in real-time from dynamically-updated sources instead of static databases often containing outdated information. U.S. Pat. No. 7,167,550 (Klos et al.) teaches a system which is designed to reformat service orders coming from various telecom service companies into a standardized format for allowing their centralized processing. US 2004/0002886 (Dickerson et al.) teaches a system for processing service orders using a pair of databases, a first one which receives the orders and carries out a first processing step consisting in deleting possible duplicates and reformatting the orders in a user-friendly format, and a second one which stores the reformatted orders and provide them for subsequent order processing operations such as used by service managers and technicians. US 2004/0267586 (McDougal et al.) teaches a system for monitoring past due telecom service orders and classify them accordingly. US 2006/0075102 (Cupit) teaches yet another method and a system for processing telecom service orders, based on retrieving appropriate configuration profile data for implementing the requested service and producing service elements to be transmitted to the appropriate entities for executing the order. US 2006/0160546 (Tang et al.) teaches a system for processing service orders in a network management system (NMS). The system comprises a receiver for receiving the service orders, a processing component for processing the service orders and transmitting them to a data network for automatic service provisioning or to a workflow management system for manual service provisioning, provided that they comply with service type data registered in a database table. The system and the related method allow the registration of a new service order type in the database table without having to shutdown and restart the NMS.

US 2006/0215557 (Corley et al.), US 2007/0038532 (Vyas) and US 2007/0156476 (Koegler et al.) teach other systems and methods for processing service orders with respect to telecom or fleet management services, while U.S. Pat. No. 6,032,132 (Nelson), U.S. Pat. No. 6,535,593 (Cashiola), and U.S. Pat. No. 5,884,284 (Peters et al.) teach other telecom-related management systems.

However, the above systems and methods are all unsatisfactory for the purpose of providing a complete, versatile and flexible solution to the problem of real-time maintaining an inventory of services and associated resources of a client company, so that the inventory is accurate.

SUMMARY

An object of the invention is to provide a system and a computerized method for real-time maintaining an inventory of services and associated resources of a client company, so that the inventory is as most accurate as possible at any time.

A subsidiary object of the invention is to provide such system and computerized method which allow billing reconciliation and optimizations of human resources, employee tracking, contract offerings and other service related aspects of the company.

According to one aspect of the present invention, there is provided a system for real-time maintaining an inventory of services and associated resources of a client company, comprising:

feeds for receiving inventory data supplied by the client company;

a product component in communication with the feeds, the product component comprising inventory modules capable of storing inventory records indicative of the services and associated resources of the client company, and a processor capable of importing the inventory data received through the feeds as corresponding inventory records stored in the inventory modules, of updating the inventory records as a function of data update requests, and of processing the inventory records to produce informative reports on selected aspects of the inventory records;

a transactional component in communication with the product component, the transactional component comprising a transaction module capable of storing copies of the inventory records stored in the product component to form corresponding transactional records, and a processor capable of copying selected inventory records from the product component into the transaction module, of processing transactions on the transactional records, of processing responses related to the transactional records, and of communicating data update requests to the product component for updating the inventory records with the transactional records as a function of the responses;

an expert engine component in communication with the transactional component and the product component, the expert engine component comprising a rule module in which conditions defining possible transactions and corresponding action parameters are stored, a service order module capable of generating service orders for external notification or intervention, and a processor capable of evaluating the transactional records against corresponding ones of the inventory records stored in the product component to identify eventual changes to be made to the inventory records stored in the product component as determined by the conditions, and controlling the service order module to generate service orders articulated on the action parameters of the transactions and the inventory records concerned by the transactions; and a user interface in communication with the product component, the transactional component and the expert engine component, the user interface being capable of displaying selected inventory records, of inputting transactions relative to the inventory records, and of inputting responses to the service orders placed by the expert engine component.

According to another aspect of the present invention, there is also provided a computerized method for real-time maintaining an inventory of services and associated resources of a client company, comprising the steps of:

importing inventory data supplied by the client company as corresponding inventory records stored in a product database component indicative of the inventory of services and associated resources of the client company;

inputting user transactions relative to the inventory of services and associated resources as reflected by the inventory records in the product database component;

copying the inventory records concerned by the user transactions from the product database component into a transactional database component;

applying user requested changes indicated by the user transactions to the inventory records in the transactional database component to form new transactional records in the transactional database component;

evaluating the new transactional records against corresponding ones of the inventory records stored in the product database component to identify corresponding eventual changes to be made to the inventory records stored in the product database component;

generating service orders indicative of the eventual changes and placing the service orders before service resources concerned by the eventual changes;

inputting responses supplied by the service resources to the service orders;

updating the inventory records in the product database component with the transactional records in the transactional database component as a function of the responses; and controllably reporting selected aspects related to the inventory records.

BRIEF DESCRIPTION OF THE DRAWINGS

A detailed description of preferred embodiments will be given herein below with reference to the following drawings, in which like numbers refer to like elements:

FIGS. 6, 7, 8, 9, 10, 11, 12, 13, 14 and 15 illustrate different screens displayed by the interface of the system.

DETAILED DESCRIPTION OF THE PREFERRED EMBODIMENTS

As used in connection with this disclosure, the term "service" refers to any characterization applying to services provided to and used by a company or a corporation in doing its business, either internally or externally. For example, the services may be telecom services used by employees of the company, computer equipments, a fleet of vehicles leased or owned by the company, etc.

As used in connection with this disclosure, the term "resource" refers to any asset of the company involved during the course of doing its business, for example human resources, telecom and computer equipments, vehicles, office equipments, etc.

As used in connection with this disclosure, the term "database", when used alone or as part of an expression, refers not only to memory units or devices for data storage, but also includes one or multiple database engines and processors, distributed over a network or not, administered by a main server or not, for processing the data stored in the memory units or devices, and communication circuits and channels for communication of the data stored in the memory units or devices with other electronic components or devices.

As used in connection with this disclosure, the terms "component" and "module" refer to discrete parts of a larger system or structure, and can take the form of hardware circuits and software routines and codes and data structures for performing functions, processing operations and other tasks, and for use with other components and modules of the system.

Figure 1:
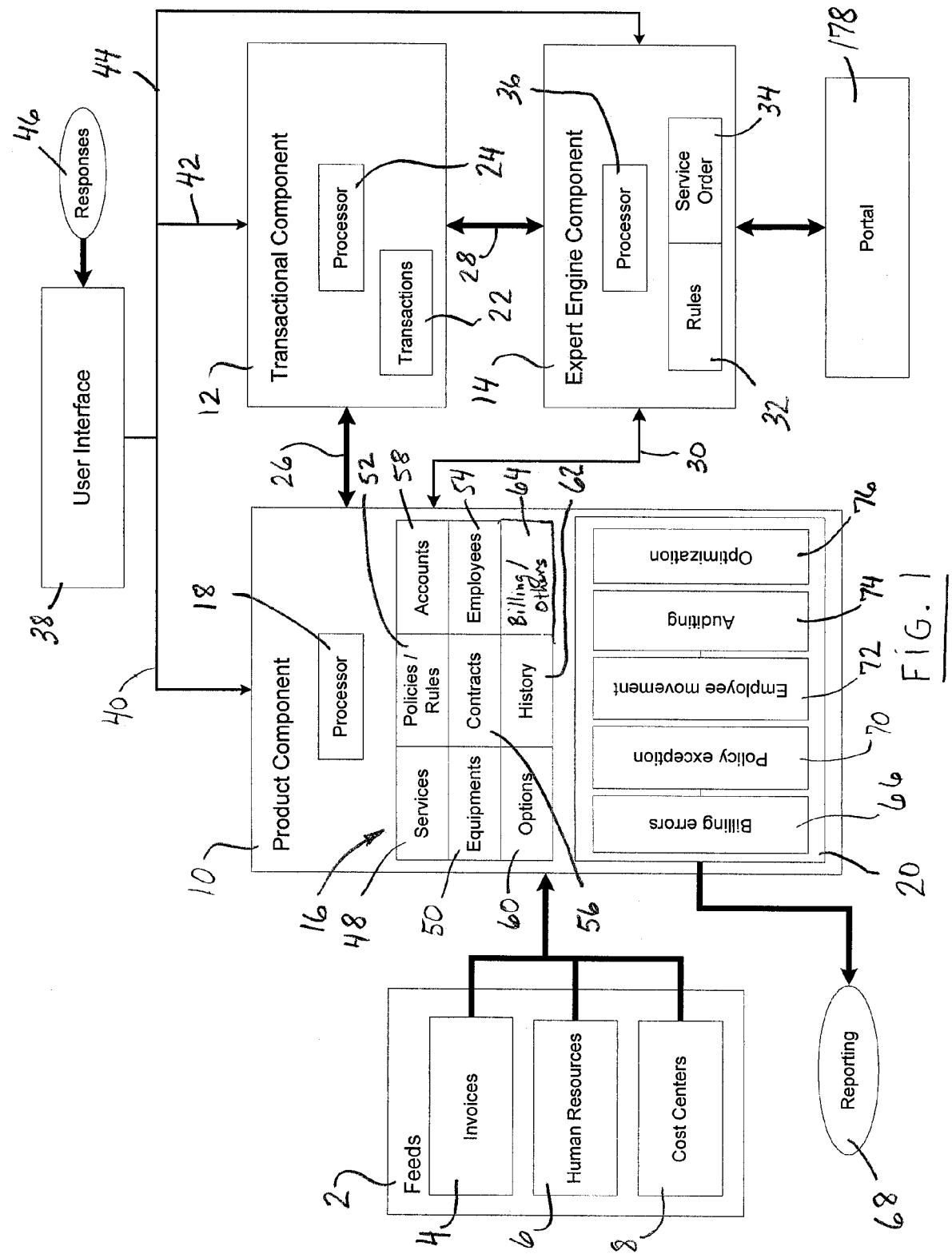
FIG. 1 is a schematic diagram showing an embodiment of the system according to the invention.

Referring to FIG. 1, there is shown a schematic diagram of a system for real-time maintaining an inventory of telecom services and associated resources of a client company, according to the invention.

Telecom services used by a client company have been chosen in this disclosure to describe embodiments of the invention for illustrative purposes only. It should be understood that any other kind of services as used by a company is contemplated.

The system maintains an accurate real-time telecom inventory of services and equipments (e.g. accessories, physical products, etc.) by allowing modification of the inventory and evaluating a change made to generate a service order (or work-order) to a concerned service provider or an administrator/manager of the inventory for the company. The service provider then acknowledges completion of the work and the inventory gets updated. The system is the foundation for being able to reconcile invoice (billing) with inventory, find billing errors, perform cellular or telecom plan optimization, apply company policies and monitor employee movement.

The system is capable of combining inventory to billing in real-time, as accuracy of the inventory is maintained in real-time. The system is directed to achieve 100% real-time inventory accuracy so as to ensure that the data managed by the system is trustworthy.

The system generally allows for the modification of inventory and evaluation of the change so as to generate a service order to the service provider. The service order is then acknowledged by the service provider, which, in turn, chooses to complete or not the service order. Based on the response given by the service provider, the inventory gets updated.

The system comprises feeds 2 for receiving inventory data supplied by the client company. The feeds may relate to various types of inventory management items of the client company, such as invoices 4 reflecting what the company is being invoiced for the services that it uses, human resources 6 providing information with respect to the employees of the company and possibly the service providers, cost centers 8 providing information regarding departments, divisions or work centers of the company.

The system comprises a database arrangement which can be broken down primarily into three components, namely a product component 10, a transactional component 12, and an expert engine component 14 which can also be referred to as a validation component.

The product component 10 is in communication with the feeds 2. The product component 10 has inventory modules 16 capable of storing inventory records indicative of the services and associated resources of the client company. The product component 10 also has a processor 18 capable of importing the inventory data received through the feeds 2 as corresponding inventory records stored in the inventory modules 16, of updating the inventory records as a function of data update requests, and of processing the inventory records to produce informative reports 20 on selected aspects of the inventory records.

The transactional component 12 is in communication with the product component 10 as depicted by arrows 26. The transactional component 12 has a transaction module 22 capable of storing copies of the inventory records stored in the product component 10 to form corresponding transactional records. The transactional component 12 also has a processor 24 capable of copying selected inventory records from the product component 10 into the transaction module 22, of processing transactions on the transactional records, of processing responses 46 related to the transactional records, and of communicating data update requests to the product component 12 for updating the inventory records with the transactional records as a function of the responses.

The expert engine component 14 is in communication with the transactional component as depicted by arrows 28 and the product component as depicted by arrows 30. The expert engine component 14 has a rule module 32 in which conditions defining possible transactions and corresponding action parameters are stored, and a service order module 34 capable of generating service orders for external notification or intervention. The expert engine component 14 also has a processor 36 capable of evaluating the transactional records against corresponding ones of the inventory records stored in the product component 10 to identify eventual changes to be made to the inventory records as determined by the conditions, and controlling the service order module 34 to generate service orders articulated on the action parameters of the transactions and the inventory records concerned by the transactions.

A user interface 38 is in communication with the product component 10 as depicted by arrows 40, the transactional component 12 as depicted by arrows 42, and the expert engine component 14 as depicted by arrows 44. The interface is capable of displaying selected inventory records, of inputting transactions relative to the inventory records, and of inputting responses 46 to the service orders placed by the expert engine component 14.

To establish the data parameters of each of the modules 16 of the product component 10, the system operator first defines what is to be evaluated. Each of the inventory data containing the data parameters may be provided by the client company in Excel™ files, Access™ files, Dbase™ files, Foxpro™ files, Filemaker™ files, etc. The inventory data can be imported into the product component 10 via custom importation processes executed by the processor 18 during product implementation, e.g. to standardize the external data source structures to a normalized structure that can be processed and evaluated by the system.

Each of the inventory modules 16 contains particular client specific information.

The inventory modules 16 may be arranged to comprise a service inventory module 48 adapted to manage inventory records in the form of tables (e.g. data subsets) and/or fields permitting to characterize a given service. Included in these tables may be fields such as employee name, passwords, cost center (e.g. departments), account information, address, comments, as well as contractual information (e.g. service contract, roaming fees, billing rate, terms and policies, etc.). Basically, any information enabling to identify a particular service (with different terms of agreement) to a person (e.g. an employee) or a distinct unit (human or physical) of the company may be included.

All information related to equipment or hardware items may be contained in an equipment (hardware) module 50. The equipment module 50 may include items such as product model (e.g. phone model Motorola RAZR™, etc.), accessories (e.g. car adaptor, leather casing, wireless headset, etc.), as well as any other physical assets corresponding to a given service.

Table I below shows a small sample of typical items that can be stored and managed by the service inventory module 48 for telecom related services usable by a company.

TABLE I

| Centrex digital | Centrex analog | Cellular |
| Calling card service | Conference | VoIP |
| Tollfree | Internet | Alarm |
| Voice mail service | Pager service | ATM service |

Table II shows a small sample of items that can be stored and managed by the equipment module 50 (typically, the items also include model and manufacturer references).

TABLE II

| Calling card | Cellular phone | Cordless |
| Fax | Modem | Pager |
| Telephone | Voice Mail | Palm Treo 600 |
| RIM BlackBerry | IP Conference Station | USB Cable |
| Modem | Tower | LCD |
| Laptop | Keyboard | Speakers |
| Power Supply | Mouse | |

Thus, the service inventory module 48 stores service characterizing data for the services to which the client company has access, while the equipment module 50 stores equipment characterizing data for equipments used in relation with the services. For example, the service inventory module 48 may include references to land lines, cellular lines, calling cards, pagers, fax lines, voice mails, toll free lines, internet access lines, frame relay circuits, T-1 lines, data lines, etc.

The inventory modules 16 may also be arranged to include a company policy module 52, an employee module 54, a contract module 56, a cost center module 58, an options module 60, and a history module 62. The company policy module 52 is adapted to store policy rule data indicative of policies and rules established by the client company with respect to usage of the services are stored. The employee module 54 is adapted to store employee data indicative of human resources of the client company. The contract module 56 is adapted to store contract data indicative of contractual terms with service providers. The cost center module 58 is adapted to store account data with respect to service providers providing the services and other possible account information in respect with the cost centers of the company. The options module 60 is adapted to store option data related to the services. The history module 62 is adapted to record history related data indicative of changes made to the inventory records. Other modules 64 may hold information such as for billing data indicative of what the client company is being invoiced with respect to the inventory of services and associated resources. Any one of the inventory modules 16 may be formed of an arrangement of multiple modules instead of a single one, if desired.

Table III below provides an example of fields that can be associated to employee related data for references in the inventory records.

TABLE III

| [Employee] | |
| [Employee_No] | [Last_Name] |
| [Middle_Name] | [First_Name] |
| [Title] | [ID_Function] |
| [ID_Department] | [ID_Status] |
| [Phone_No] | [Last_Status_Change] |
| [Origin] | [Address_Line1] |
| [Address_Line2] | [City] |
| [Province] | [Country] |
| [Postal_Code] | [EMail] |
| [Logon_User] | [ID_Department_Pending] |
| [ID_Employee] | |

Table IV below provides an example of fields that can be associated to cost center related data for references in the inventory records.

TABLE IV

| [Cost_center] | |
| [Cost_Center_No] | [ID_Division] |
| [Cost_Center_Name] | [ID_Subsidiary] |
| [Address_Line1] | [Parent_Department_Key] |
| [Address_Line2] | [IS_Cost_Center] |
| [City] | [IS_Department] |
| [Province] | [ID_Status] |
| [Country] | [Origin] |
| [Postal_Code] | |
| [Phone_No] | |
| [Fax_No] | |

Figures 6, 7:
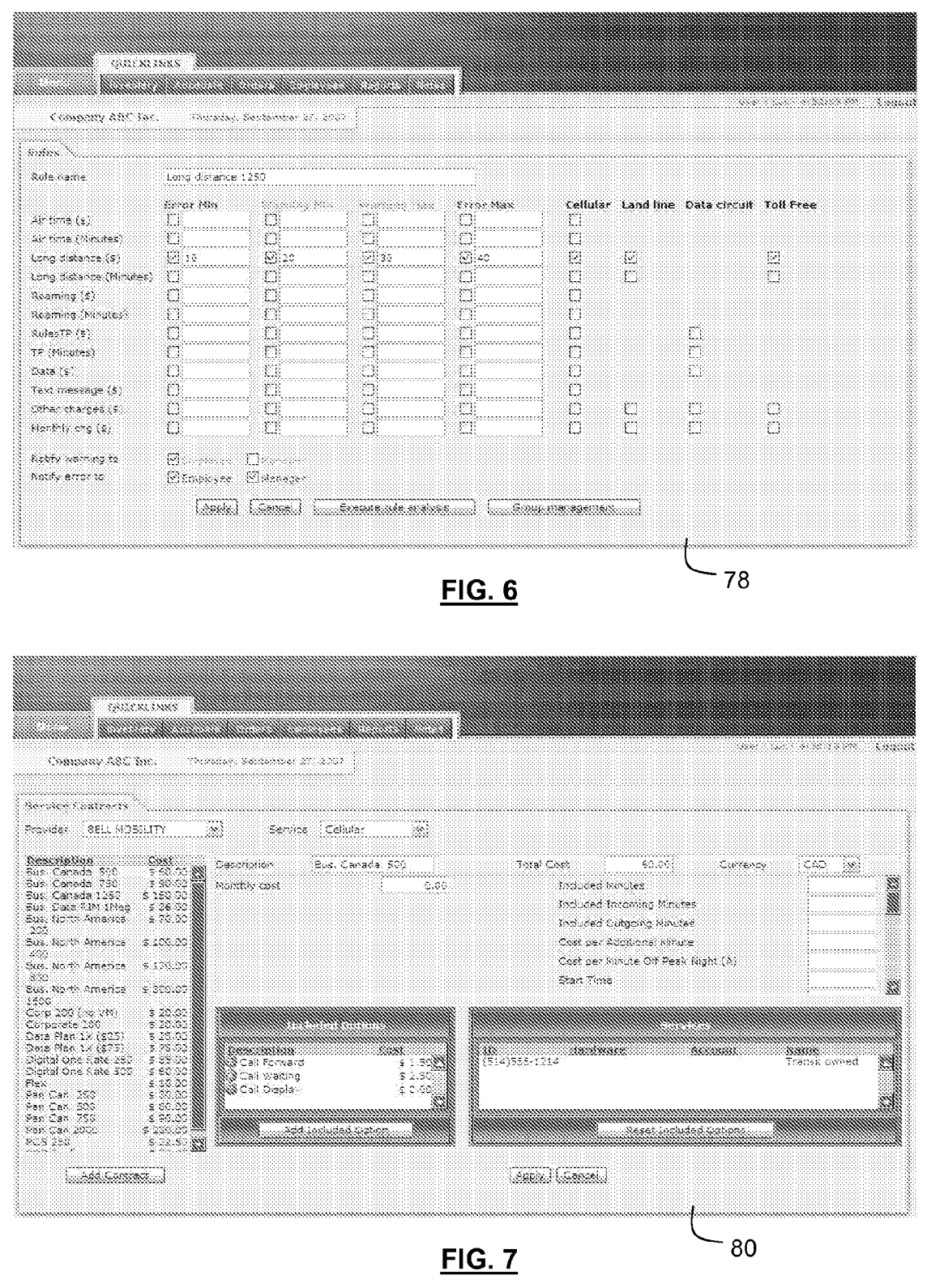

Referring to FIG. 6, there is shown an example of a screen 78 displayed by the interface 38 (shown in FIG. 1), illustrating parameters defining a rule for long distance calls. These parameters are stored in the rule module 52 (shown in FIG. 1).

Referring to FIG. 7, there is shown an example of a screen 80 displayed by the interface 38 (shown in FIG. 1), illustrating contract parameters for a given service ("Bus. Canada 500" in the example). These parameters are stored in the contract module 56 (shown in FIG. 1).

Figure 8:
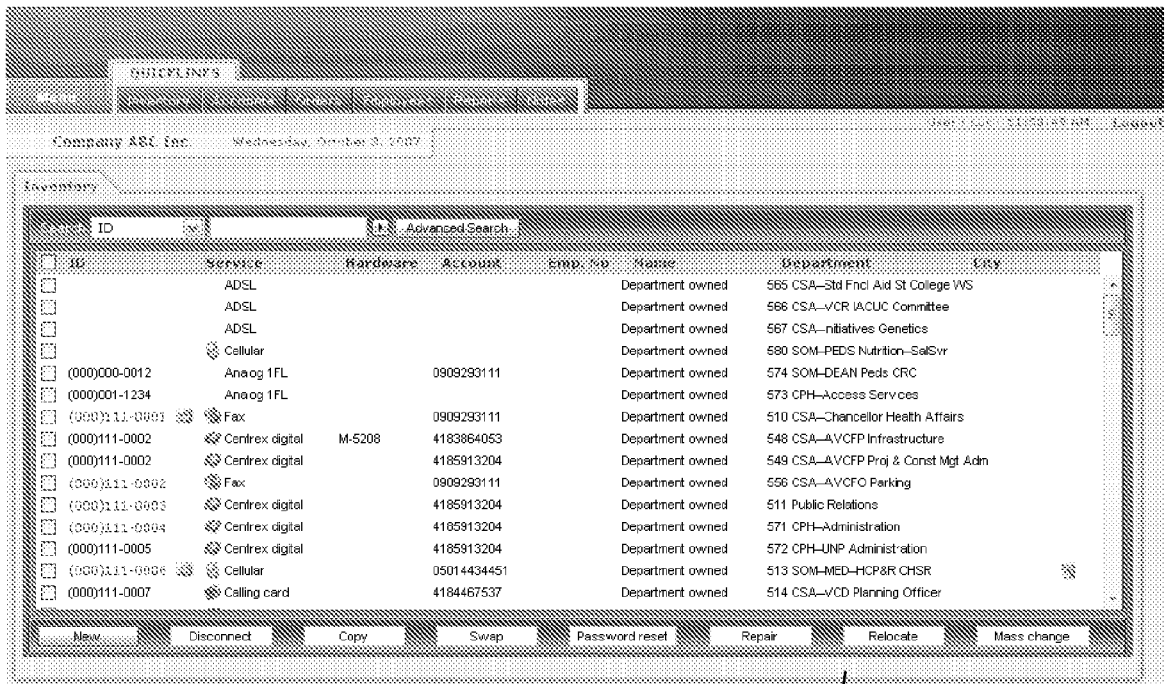

Referring to FIG. 8, there is shown an example of a screen 82 displayed by the interface 38 (shown in FIG. 1), illustrating an inventory listing of the company (Company ABC Inc. in the example). Each inventory item has an identifier (ID), such as the telephone number of an employee of the company. Services and hardware (equipment) are associated to the inventory items, along with other useful information such as account information, employee number, service owner, department (cost center), address information, etc. These parameters are stored in the modules 48, 50, 58, 54, 64 (shown in FIG. 1). Various possible operations to manage the inventory items are selectable at the bottom of the screen 82 (those illustrated may be changed to meet the needs of the company).

Figure 9:
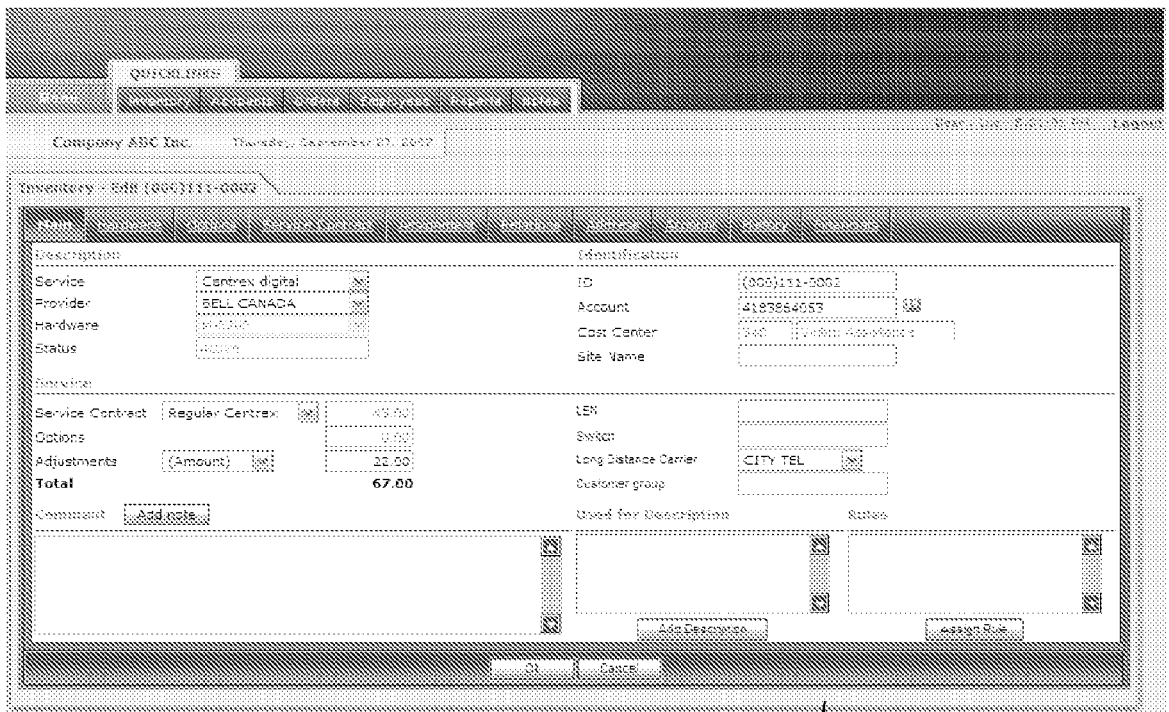

Referring to FIG. 9, there is shown an example of a screen 84 displayed by the interface 38 (shown in FIG. 1), illustrating an inventory edit operation. Among the editable/selectable service parameters of a given service are the service provider, the associated hardware (equipment), the account information, the service contract, etc. Various useful information may also be displayed, such as the service ID, a status of the service, the cost center using the service, service contract and associated options costs, etc.

Figures 10, 11:
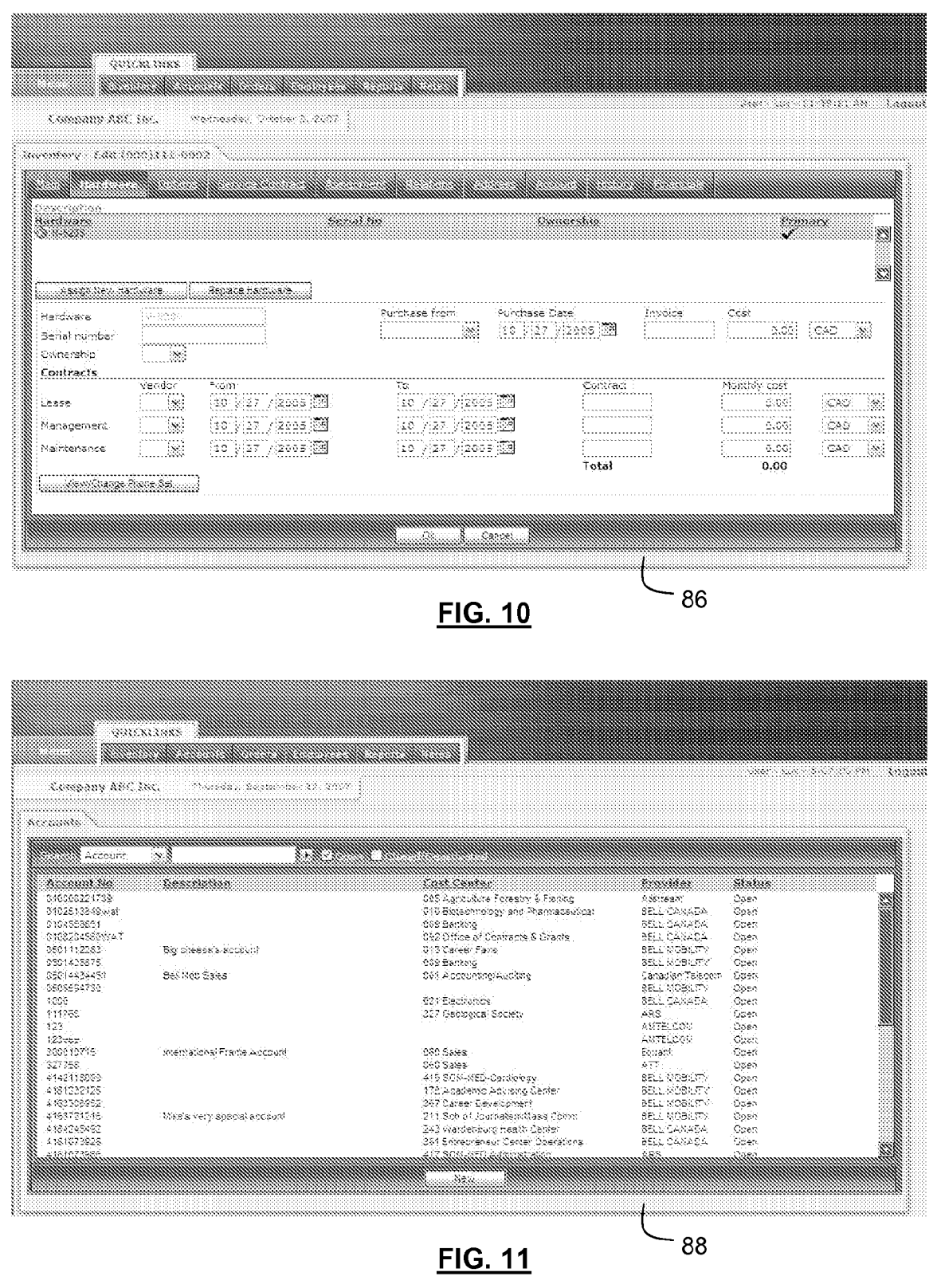

Referring to FIG. 10, there is shown an example of a screen 86 displayed by the interface 38 (shown in FIG. 1), illustrating a hardware (equipment) assignment operation for a given service. Various useful information related to the equipment may also be entered or reported, such as purchase information, contract information, etc.

Referring to FIG. 11, there is shown an example of a screen 86 displayed by the interface 38 (shown in FIG. 1), illustrating an account listing with related account information such as cost center information, service providers, etc.

Referring back to FIG. 1, the processor 18 of the product component 10 is preferably capable of analyzing any of the feeds 2 against the inventory records stored in the product component 10, e.g. for evaluation and report purposes. In analyzing the billing data received through the feed 4, the processor 18 may in particular be capable of detecting possible billing errors and of producing a report identifying the possible billing errors as depicted by block 66, for eventual reporting 68 to the client company.

The processor 18 may be adapted or arranged to also detect policy exceptions 70 using the billing data with respect to the policy rule data, to monitor employee movements 72 based on the billing data, the employee data and the service data indicative of the services allotted to the human resources, to audit 74 the inventory records, and to optimize 76 contract offerings as a function of the billing data, the contract data and the policy rule data (other optimization processes may be implemented, e.g. for equipment usage optimization), in addition to producing history related data as a function of the changes made to the inventory records and updating the history module 62 with the history related data. The reports 68 resulting from the above processings of the feeds 2 may be displayed on the interface 38, printed, or provided to a user in other forms such as through an e-mail transmission.

The system may conduct a cross-check of the inventory records contained within the product component 10 against the external data sources provided through the feeds 2 on a periodic time basis (e.g. monthly) and/or on demand, e.g. in response to a user request entered through the interface 38.

Figure 12:
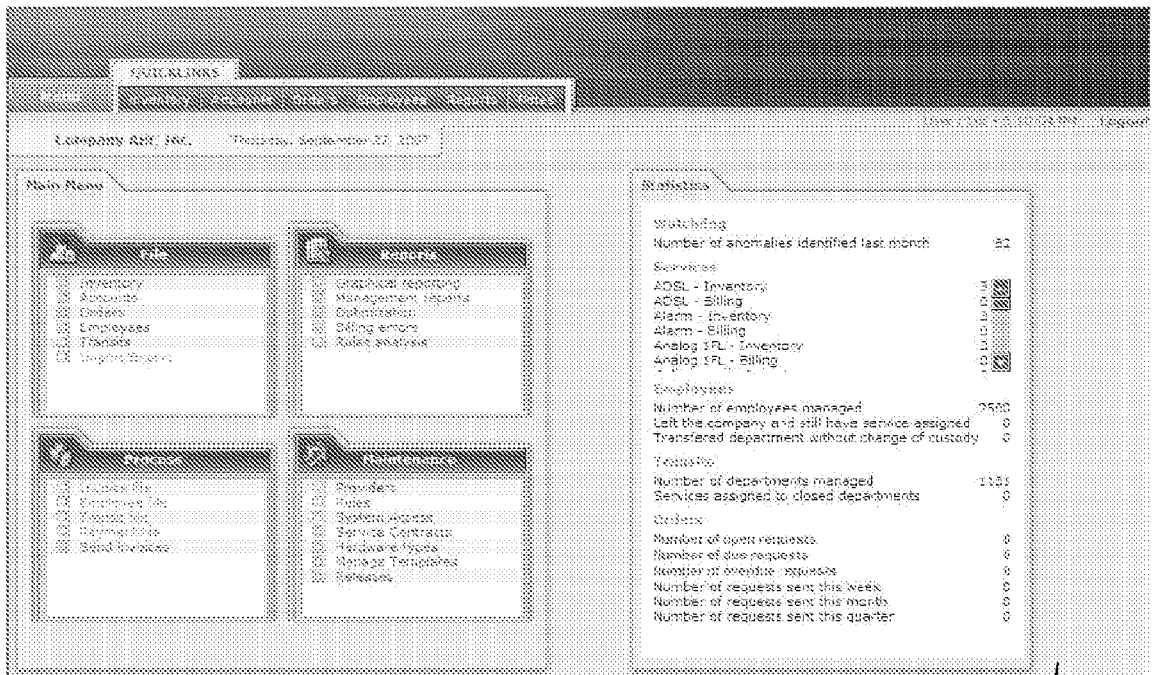

Referring to FIG. 12, there is shown an example of a screen 90 displayed by the interface 38 (shown in FIG. 1), illustrating a main menu for interacting with the system. The screen 90 provides quick links to frequently accessed features of the system, such as the inventory screen 82 (shown in FIG. 8), the account screen 88 (shown in FIG. 11), and other screens relating to orders, employees, reports and notes. The quick links may be customized differently if desired. The screen 90 provides access to other features of the system, such as to particular files related to the inventory records, processes of the system, reports that can be generated by the system, and maintenance functions, in addition to showing statistics and other useful information.

Figure 13:
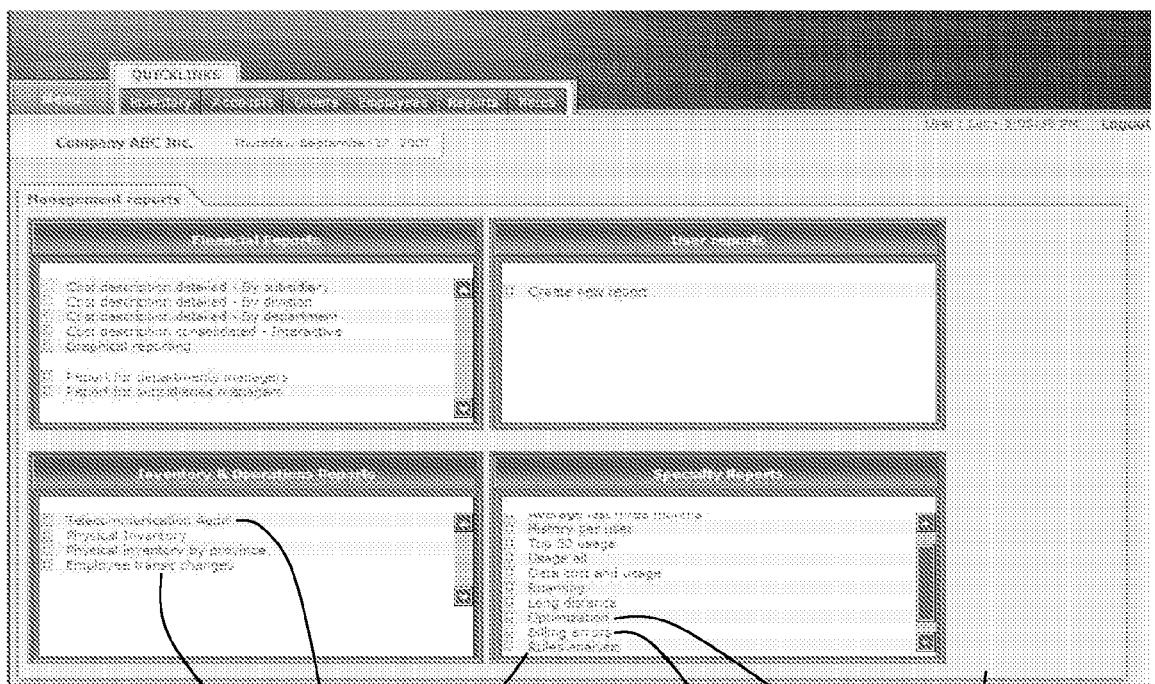

Referring to FIG. 13, there is shown an example of a screen 92 displayed by the interface 38 (shown in FIG. 1), illustrating reports that can be selected and produced by the system, such as billing errors 66, policy exception 70, employee movement 72, auditing 74, optimization 76, etc.

Referring to FIG. 14, there is shown an example of a screen 94 displayed by the interface 38 (shown in FIG. 1), illustrating a report of potential billing errors found by the system.

Referring to FIG. 15, there is shown an example of a screen 96 displayed by the interface 38 (shown in FIG. 1), illustrating a report of a telecom audit for a selected department (cost center) of the company.

The transactional component 12 is used for managing transactions involving the inventory records. Initially, the processor 24 of the transactional component 12 operates to copy the inventory record to be subjected to a transaction (e.g. a change, an action) from the product component 10. The copy of the inventory record is stored in the transaction module 22 and includes copies of the relevant data in the service inventory module 48, hardware inventory module 50, and possibly in the other modules 52, 54, 56, 58, 60, 62, 64 as need be in respect with the inventory record concerned in the transaction. Once a user interfaces with the transactional component 14 through the user interface 38, in real-time, the transactional component 14 stores any action or modification made to any of the aforementioned modules, for example changes made to terms of the contract (e.g. contractual obligations), physical assets, etc., up to the moment the action and/or modification has been acknowledged or validated by the user.

Having dual product and transactional components 10, 12 facilitates operations to cross-reference (or cross-check) any modification or action made between the inventory records in the product and transactional components 10, 12 in real-time, to notify the user of any modification or action to take, and subsequently to request validation of the modification or action by the user.

Once an action or modification has been recognized by the expert engine component 14 and subsequently validated by the user, the product component 10 is updated to contain the new information contained in the transactional component 12. In other words, the transactional component 12, containing the new information, is copied onto the product component 10, thereby removing outdated information. Therefore, projects or actions having a pending status now appear as completed. It is worth noting that the system keeps histories (or archive) of any action and/or modification made to the product and transactional components 10, 12, e.g. in the history module 62.

During transactions affecting the inventory records, the transactional component 12 first holds a "carbon-copy" of the inventory records stored in the product component that are concerned by the transactions, and manages the transactions with the exception that it does not do any comparison (evaluation or reconciliation) with the external data sources supplying the feeds 2. Instead, the transactional component 12 is used as a temporary data store to hold the pending change requests to any of the parameters of the inventory records initially defined in the product component 10. Once a user has made a change request to any of the parameters, this pending change request is compared against the product component 10 via the expert engine component 14. Even if no change has been detected, the expert engine component 12 may control the service order module 34 so that a service order is still generated in order to obtain client or user confirmation of the requested information.

During the cross-checking process, the expert engine component 14 plays an essential role in the system, as it enables the end-user (e.g. a service provider, an administrator of the company) to accept and/or refuse certain actions and/or modifications to the inventory record in the product component 10. Indeed, the end-user can choose to update (accept) the product component 10 with the new information contained in the transactional component 12 (e.g. validation), request the system to notify the service provider or a third party of an action to take (e.g. change a client's telephone number, etc.), and once confirmation has been received from the service provider or third party, to do the action, and/or refuse the action, thus not updating the product component 10 with the new information contained in the transactional component 12.

All operations performed by the product component 10, the transactional component 12 and the expert engine component 14 in connection with the modules 16, the transactional module 22, the rule module 32 and the service order module 34 are carried out by the respective processors 18, 24, 36. The processors 18, 24, 36 may be embodied through a single or multiple processors, distributed over a network or not.

As alluded to hereinabove, the validation of an action or modification made to the product component 10 is a process where ultimately the end-user has the final say as to whether or not to accept the proposed modification or action to take.

For any modification to the product component 10 requiring notification of a service provider or third party, a service order or work-order (e.g. a ticket) is generated. In creating a service order, the system blocks the users from making any further modifications to predetermined sensitive items such as the account until the requirements of the service order have been either validated and executed or, alternatively, cancelled. In this respect, the processor 24 of the transactional component 12 is capable of assigning status to the transactions and of blocking new transactions on the inventory records concerned by the transactions having a pending status until reception of the responses to the service orders corresponding to the transactions.

Some data fields of the inventory records do not imply transactions, and therefore need not be copied into the transactional component 12. As such, any modification to that type of data does not require the creation of a corresponding transactional record nor possibly the creation of a service order. Also, the users will not be blocked from making modifications to this type of data. Also, the service orders may have predetermined fields (e.g. additional comments, notes) directly editable through the user interface 38.

Fields that can be excluded from the transactions and do not get evaluated may be such as comments indicative of general comments of the service, usage information indicative of what the service is used for (e.g. emergency), notes like diary notes (e.g. Disconnect on June 25th), advanced description for the services.

In the same optic, not all actions or modifications to an account or inventory record item, some of which requiring service provider or third party confirmation, will block users from further modifying the item. Indeed, such is the case for initializing or modifying certain service inventory module records (e.g. password reinitialization and/or modifications to access voicemail).

Additionally, in general, all actions and/or modifications to be taken by the end-user in regard to an account preferably have a transaction life-cycle or status such as exemplified in table V below.

TABLE V

"active" or "pending", meaning that all transactions, created by default or otherwise, have such a status;
"executed", meaning that, following the validation process, the action or modification has been appropriately dealt with by the end-user;
"cancelled by user", meaning that, before creation of a service order, the transaction has been cancelled by the end-user;
"removed from service order", meaning that an element of an existent service order (e.g. a particular transaction), and prior its validation by the service provider or third party, has been removed and/or deleted by the end-user;
"expired by system", meaning that a transaction, whether created by default or not, has been deleted by the system, as done in accordance with predetermined delays provided in the system's parameters so that transactions may automatically expire if the action has not taken place in the prescribed delay;
"discard by user", applying in cases wherein one or more users are interfacing with pending or same transactions, in which cases the system is arranged to request if the user would like to cancel modifications made by a previous or other user and work from the original or initial record (data set); this function may also be used in cases wherein an end-user TABLE V-continued previously worked on an account and decides to re-open the session at a later time, in which case the system is arranged to ask if the user would like to recover the modifications made before closing his/her session or abandon those modifications;
"service order cancelled", meaning that an existent service order has been cancelled either before being sent to the service provider and/or third party or before its execution;
"no execution needed", meaning that, in cases of the creation of a service order, the system does not block the user from carrying out other actions or modifications to an account (e.g. re-initialization of a password for a voicemail account).

As aforesaid, the system uses inventory as the starting point to generate a service request by letting a user update the inventory only once to reflect the final outcome of the change, and evaluation of what has changed in turns generates a service order. The requested changes in a service order can then get applied to the inventory since the change was carried out from there to begin with.

The system can be used for maintaining various types of inventories in order to perform for example fleet management, as the inventory component 10 of the system can be easily adapted to accommodate fleet move/add/changes and repairs as well as service records and requests. The system meets the needs of managed fleets, using the same model for managing telecoms. The system can be of course advantageously used for other types of applications, including inventory tracking.

All change requests from the product component 10 are processed by the transactional component 12 and the expert engine component 14, ensuring that data representation reflects reality (or accuracy) while validating external data sources/feeds. The processor 18 of the product component 10 constantly evaluates/validates the feeds 2 (e.g. invoices 4, human resources 6, cost-centers 8, etc.) against set inventory records which make up the product component 10. The inventory records are constantly updated with what data the client company provide. Indeed, what makes up a strength of the system is based primarily on the accuracy of the data set contained within the product component 10, which is made up of the inventory records stored through the modules 16. This feature enables the client company to reconcile for example billing with its inventory of services and equipments which is now maintained accurate by the system. In such a case, the reconciliation process consists of a comparison between what is accurately contained in the product component 10 with what the client is being invoiced. A continuous cross-check between what is input into the system with what already exists in the product component 10 can be achieved.

Also being cross-checked against the product component 10 may be, for example, human resource (HR) information, cost-center information, as well as any other type of information that can be cross-checked against the inventory records managed and stored in the product component 10, such as hardware data feeds (not shown), etc.

Figure 2:
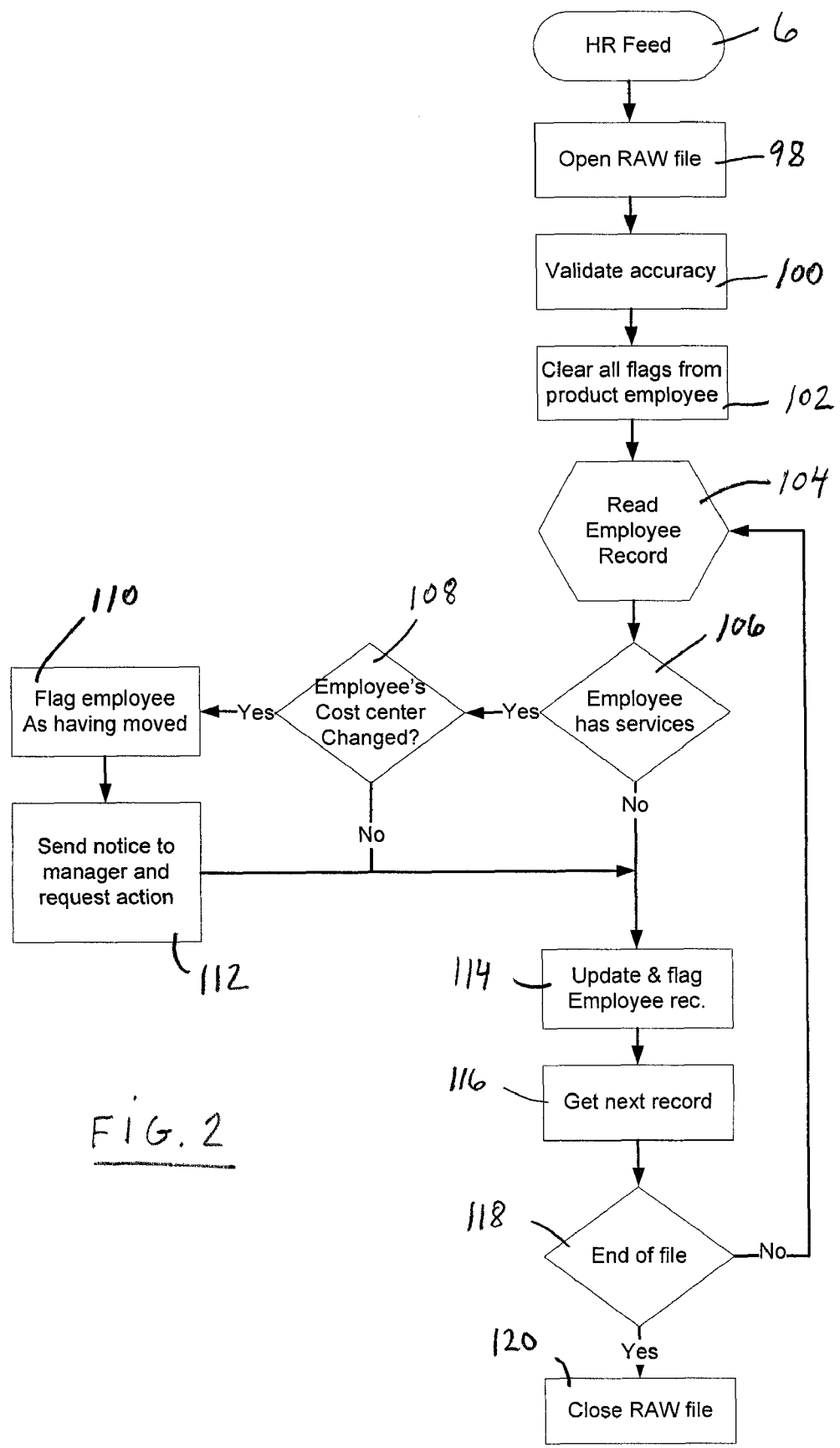
FIG. 2 is a flowchart illustrating an import operation of human resources feed data.

Referring to FIG. 2, there is shown a cross-checking process performed by the processor 18 of the product component 10 (shown in FIG. 1) during importation of human resources data from the human resources feed 6. The process proceeds by opening the raw file provided by the client company as depicted by block 98, validating the accuracy of the file as depicted by block 100, clearing all flags possibly set in relation with the processed employee in the product component 10 as depicted by block 102, and then reading the employee related data in the inventory records stored in the product component 10 as depicted by block 104. The process then verifies if the processed employee has services assigned to him/her as depicted by block 106. In such a case, verification is made in case where the employee's cost center has changed as depicted by block 108, in order to flag the processed employee has having moved and send a notice to the manager and request action through a service order to be generated by the service order module 34 of the expert engine component 14, as depicted by blocks 110, 112. The inventory records are updated and flags are set depending on the applicable conditions and possible responses from the manager, as depicted by block 114. Each employee data record in the raw file is subjected to the same process until the end of the file is reached and the file is closed, as depicted by blocks 116, 118, 120. Each employee record can be imported into the system on a periodic period to ensure accuracy of the employee information. When an employee having services assigned changes cost center, the manager is then informed and appropriate action can be taken accordingly.

Figure 3:
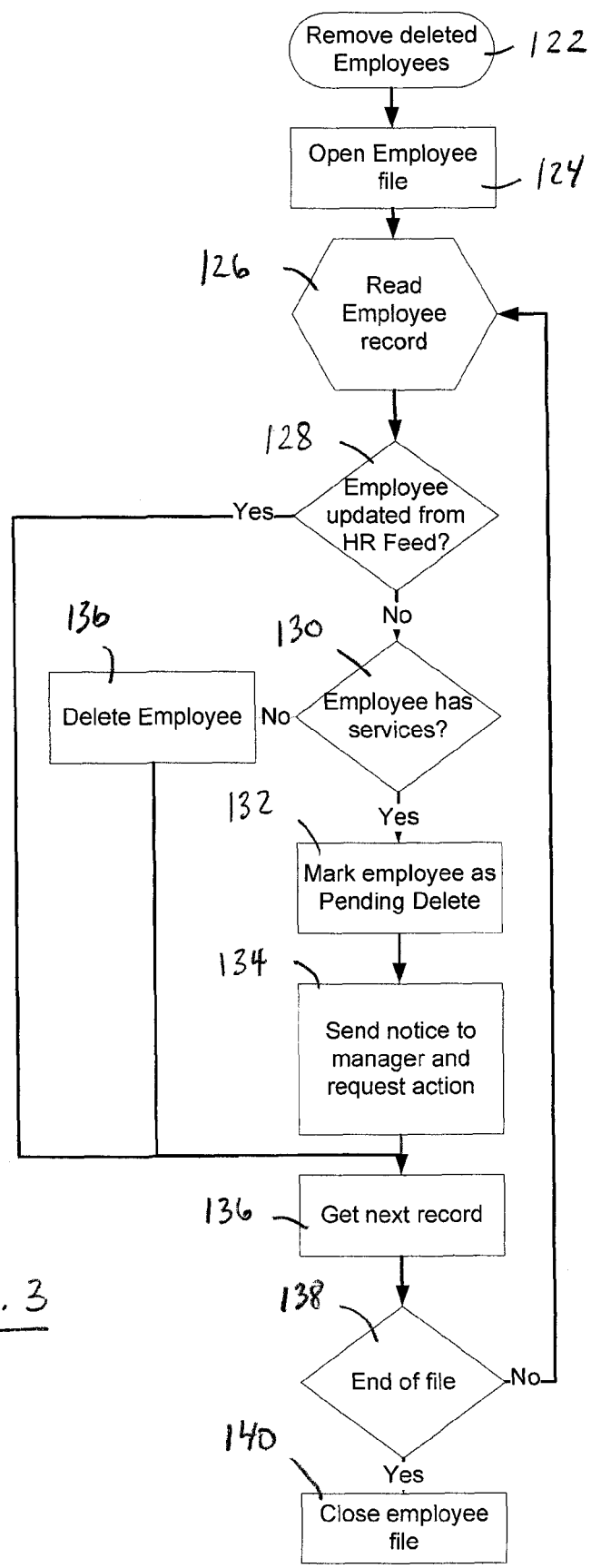
FIG. 3 is a flowchart illustrating an employee update operation.

Referring to FIG. 3, there is shown a process for removing deleted employees from the employee file of the client company, as depicted by block 122. The process involves the steps of opening the employee file and reading each employee record as depicted by blocks 124, 126, and then verifying if the processed employee has been updated from the HR (Human Resources) feed as depicted by block 128. If such is the case, then the process verifies if the employee has services assigned to him/her as depicted by block 130, in which case the employee is marked as pending delete and a notice is sent to the manager to request action through a service order, as depicted by blocks 132, 134. Otherwise, the employee information is deleted in the employee file, as depicted by block 136. The process is repeated for each employee record until the end of the employee file is reached and then is closed, as depicted by blocks 136, 138, 140. Employees no longer in the human resources feed can thus be removed from the (master) employee file. If the employee information to be deleted has services assigned, he/she is preferably not deleted immediately as, instead, a notification is sent to the manager for eventual action (e.g. confirming delete).

Figure 4:
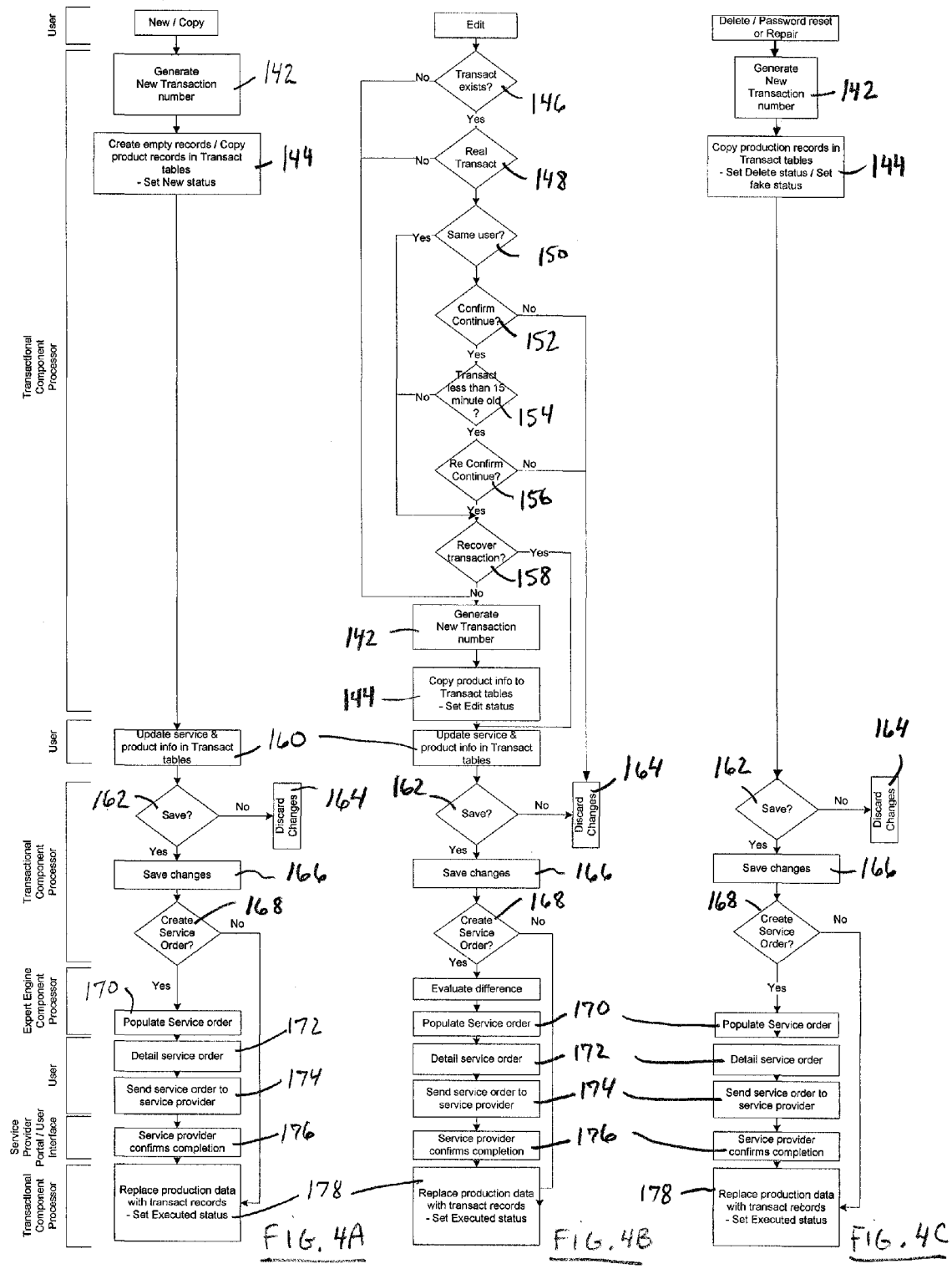
FIGS. 4A, 4B and 4C are flowcharts illustrating possible transactions on the inventory records and their respective life cycles.

Referring to FIGS. 4A, 4B and 4C, there are shown the processes for performing different types of transactions on the inventory records and their respective life cycles through the system's components or user inputs. FIG. 4A illustrates a transactional process for creating a new inventory record from scratch or from a copy of an existing inventory record. FIG. 4B illustrates a transactional process for editing an existing inventory record. FIG. 4C illustrates a transactional process for deleting an inventory record or for performing a password reset or repair operation.

To create a transactional item/record in the transaction module 22 of the transactional component 12, the system, through the processor 24 of the transactional component 12, first assigns a transactional number (or ID) to the pending change (or action), as depicted by block 142. Depending on the type of the transaction (new, copy, edit, delete, etc.), copies of the contents of the service inventory module 48, the equipment/hardware module 50 and other possibly concerned ones of the modules 16 are made into the temporary transaction module 22, as depicted by block. After a copy of the product component has been made, the user can then make changes (e.g. the pending change request) to any of the data parameters contained within the copy of the inventory records that came from the product component 10. Such changes (or actions) can include the creation of new inventory record/profile (not containing any new data parameters that are not already included in the initial product component 10), editing, deleting and copying any existing data parameters included in the product component 10. In the case of an edit operation, the processor 24 of the transactional component 12 conditionally verifies if a transaction involving the inventory record already exists, if the transaction is real, if it is from the same user, requests a confirmation before continuing, verifies how much time has elapsed since the transaction has been initiated, requests again a confirmation before continuing, and recovers the transaction if applicable, as depicted by blocks 146, 148, 150, 152, 154, 156, 158.

After the user has made a change as depicted by block 160 and the processor 24 of the transactional component 12 has processed the change to temporarily save the change and determine if the changed parameters represents a true transaction or not (e.g. a password reset/repair or comments are field items that can be directly updatable from the user interface 38 shown in FIG. 1) as depicted by blocks 162, 164, 166, 168, the new transactional item (containing a particular transact ID) is then compared against the corresponding inventory record in the product component 10 via the expert engine component 14. Regardless of whether or not a change has been detected, a service order is generated and sent the service provider or the manager or the user who will acknowledge (e.g. confirm or reject) the service order, as depicted by blocks 170, 172, 174, 176. In the case of an edit operation, the processor 36 of the expert engine component 14 evaluates the difference between the inventory record in the product component 10 and the transactional record in the transactional component 12 to align the service order on the differences. The notification process (transmission of the service order) can be done via a service provider portal 178 (as shown in FIG. 1) having communicating capabilities for transmitting the service orders to remote service provider equipments and/or user equipments, and possibly reception capabilities for receiving the responses to the service orders from the service provider or user equipments and forwarding the responses to the transactional component 12. If the service provider (or user or manager) accepts the change, the corresponding transaction (identified with an ID tag) is carried out by the processor 24 of the transactional component 12, so that the transactional record stored in the transactional module 22 is copied onto the appropriate modules 16 of the product component 10, thereby updating the corresponding inventory record, as depicted by block 178.

Referring back to FIG. 1, the expert engine component 14 is arranged to detect changes to any of the data parameters of an inventory record contained within the product component 10 by comparing the content of the transactional and product components 10, 12 in real-time, and by making use of set rules defined in the rule module 32, which are dependent on the type of action undertaken by the system user.

Table VI below shows an example of possible conditions and actions defined in the rule module 32 of the expert engine component 14.

TABLE VI

| Request | Condition | Action |
| --- | --- | --- |
| Add new service | Primary provider different from alternate provider | Pick LD (Long Distance) |
| | Service contract indicated | Assign new service contract |
| | Address indicated | Employee address Department address Cost center address |
| | Service type is toll free | Routing type Terminating numbers |
| | Options indicated | Add options |

TABLE VI-continued

| Request | Condition | Action |
|---|---|---|
| Reset password of existing service | Request to reset password | Reset password |
| Disconnect service | Request to disconnect service | Disconnect service |
| | Primary provider different from alternate provider | Unpick LD |
| Suspend service | Request to suspend service | Suspend service |
| Edit existing service | Primary number in transactional component different from that in product component | Change service ID |
| | Primary provider in transactional component different from that in product component | Cancel service Provider service conversion |
| | Alternate provider in transactional component different from that in product component | Pick/Unpick LD |
| | Primary account in transactional component different from that in product component | Transfer service from account to another |
| | Service contract in transactional component different from that in product component | Change service plan |
| | Routing type and toll free terminating in transaction component different from that in product component | Routing type and toll free terminating changes |
| | Options in transactional component different from that in product component | Add/Remove options |
| | Equipment in transactional component different from that in product component | Add new equipment |
| | Address in transactional component different from that in product component | Employee address Department address Cost center address |
| | Assignment in transactional component different from that in product component | New assignment |
| | Set programming in transactional component different from that in product component | New set programming |

Depending on the type of pending change made to the transactional component 12, the expert engine component 14 is able to identify the future corresponding changes to be made to the product component 10 and notify the service provider of this change before committing to the change (or action). For example, if the system user want to change an address of a service provider (or of another person, e.g. a client), the expert system component 14 compares the changed address with the address contained within the product component 10, and after having received confirmation from the service provider, updates the product component 10 with the new address contained in the transactional component 12.

Figure 5:
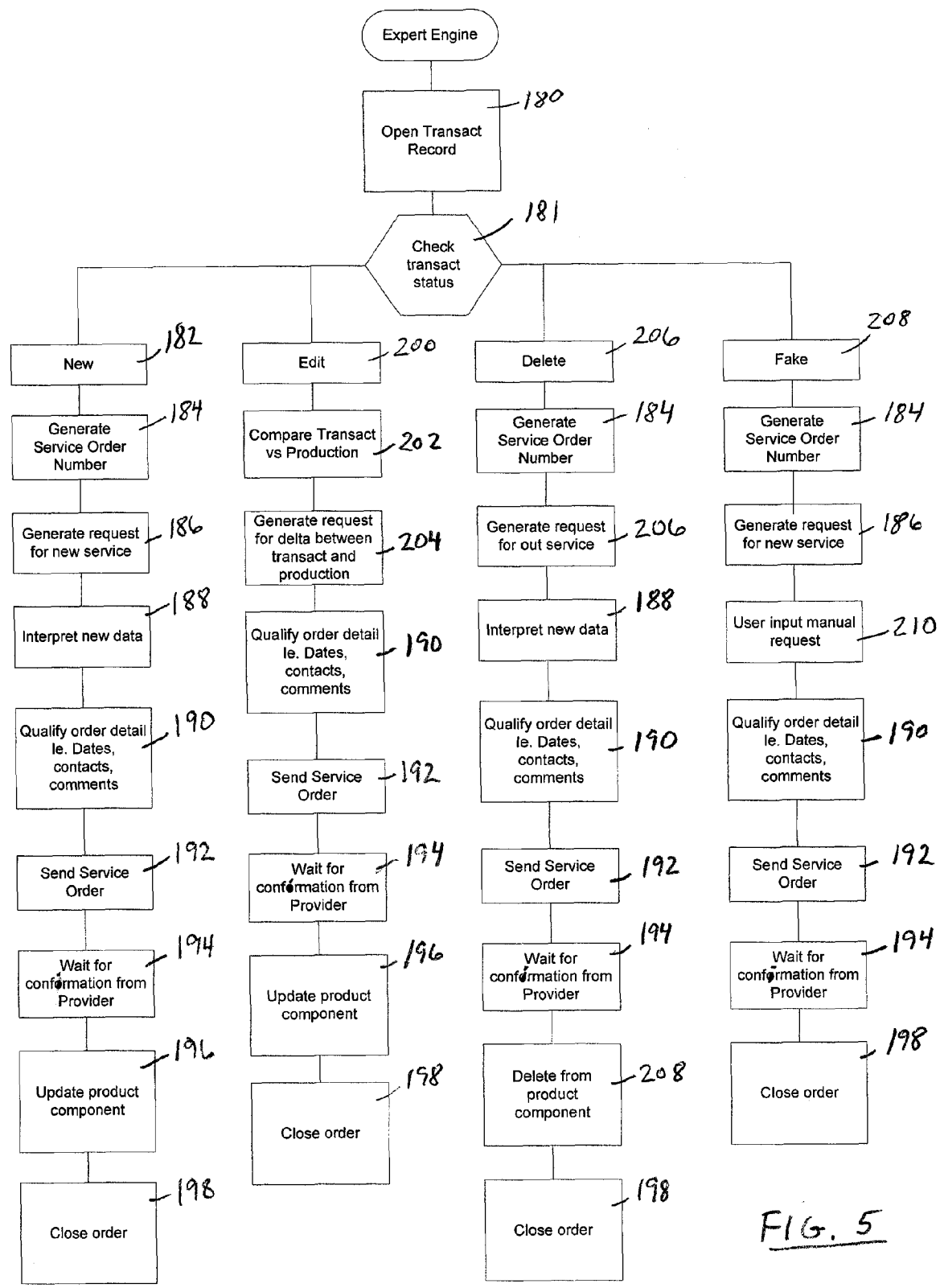
FIG. 5 is a flowchart illustrating processing operations of the expert engine component of the system.

Referring to FIG. 5, there is shown an example of the process carried out by the expert engine component 14 for evaluating a transaction. First, the transactional record is opened as depicted by block 180 and the transaction status is checked as depicted by block 181. For a new status as depicted by block 182, the process comprises the operations to generate a service order number, generate a request for a new service, interpret the new data of the transaction, qualify the order details (e.g. dates, contracts, comments), send a service order, wait for confirmation from the provider, update the product component and close the order, as depicted by blocks 182, 184, 186, 188, 190, 192, 194, 196, 198. In the case of an edit status as depicted by block 200, the process is different in that a comparison of the transactional record is compared with the corresponding inventory record and a request is generated for the difference between the transactional record and the product record as depicted by blocks 202, 204. For a delete status as depicted by block 206, the request generated is for out service as depicted by block 206 and the appropriate item is deleted from the product component as depicted by block 198. In the case of a fake status as depicted by block 208, a manual request is inputted by the user as depicted by block 210.

Referring again to FIG. 1, when a particular action is requested, the expert system component 14 sequentially evaluates all the rules contained in the rule module 32 (as listed in Table VI above) to make the eventual service order and modification to the product component 10. The system can accept multiple changes in parameters (e.g. change in address, change in contract, phone number, options, etc.). Comments may be included in a person's service order or profile, but are not evaluated by the expert engine component 14.

The invention is versatile in its potential applications, including asset management, fleet management and distribution of products (e.g. inventory tracking, etc.).

Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code referred to in this disclosure are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

The disclosed processes may be embodied in a computer program product comprising a memory having computer readable code embodied therein, for execution by a processor. On a practical level, the computer program product may be embodied in software enabling a computer system to perform the operations, described above in detail, supplied on any one of a variety of media. An implementation of the approach and operations of the invention may be statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents. The memory of the computer program product may take the form of a diskette, a tape, a compact disc, an integrated circuit, a ROM, a CD, a cartridge, a remote transmission via a communication circuit, or any other similar medium useable by computers. For example, to supply software for enabling a computer system to operate in accordance with the invention, the supplier might provide a diskette or might transmit the software in some form via satellite transmission, via a direct telephone link, or via the Internet. A carrier wave may embody a computer data signal representing sequences of statements and instructions which, when executed by a processor, cause the processor to perform the conversion process.

The invention claimed is:

1. A system for real-time maintaining an inventory of services and associated resources of a client company, comprising:
   feeds for receiving inventory data supplied by the client company;
   a product component in real-time communication with the feeds, the product component comprising inventory modules capable of storing inventory records indicative of the services and associated resources of the client company, and a processor capable of importing the inventory data received through the feeds as corresponding inventory records stored in the inventory modules, of updating the inventory records as a function of data update requests, and of processing the inventory records to produce informative reports on selected aspects of the inventory records;
   a transactional component in real-time communication with the product component, the transactional component comprising a transaction module capable of storing copies of the inventory records stored in the product component to form corresponding transactional records, and a processor capable of copying selected inventory records from the product component into the transaction module, of processing transactions on the transactional records, of processing responses related to the transactional records, and of communicating data update requests to the product component for updating the inventory records with the transactional records as a function of the responses;
   an expert engine component in real-time communication with the transactional component and the product component, the expert engine component comprising a rule module in which conditions defining possible transactions and corresponding action parameters are stored, a service order module capable of generating service orders for external notification or intervention, and a processor capable of evaluating the transactional records against corresponding ones of the inventory records stored in the product component to identify eventual changes to be made to the inventory records stored in the product component as determined by the conditions, and controlling the service order module to generate service orders articulated on the action parameters of the transactions and the inventory records concerned by the transactions; and
   a user interface in real-time communication with the product component, the transactional component and the expert engine component, the user interface being capable of displaying selected inventory records, of inputting transactions relative to the inventory records, and of inputting responses to the service orders placed by the expert engine component.

2. The system according to claim 1, wherein:
   the inventory modules comprise a billing module capable of storing billing data indicative of what the client company is being invoiced with respect to the inventory of services and associated resources; and
   the processor of the product component is further capable of analyzing the billing data against the inventory records stored in the product component, of detecting possible billing errors and of producing a report identifying the possible billing errors.

3. The system according to claim 2, wherein:
   the inventory modules further comprise a service inventory module in which service characterizing data for the services to which the client company has access are stored, an equipment module in which equipment characterizing data for equipments used in relation with the services are stored, an employee module in which employee data indicative of human resources of the client company are stored, a company policy module in which policy rule data indicative of policies and rules established by the client company with respect to usage of the services are stored, a contract module in which contract data indicative of contractual terms with service providers are stored, and a cost center module in which account data with respect to service providers providing the services are stored; and
   the processor of the product component is further capable of at least one of detecting policy exceptions using the billing data with respect to the policy rule data, monitoring employee movements based on the billing data, the employee data and the service data indicative of the services allotted to the human resources, auditing the inventory records, and optimizing equipment usage as a function of the billing data, the contract data and the policy rule data.

4. The system according to claim 1, wherein the inventory modules further comprise a history module in which history related data indicative of changes made to the inventory records are stored, and the processor is further capable of producing history related data as a function of the changes made to the inventory records and updating the history module with the history related data.

5. The system according to claim 1, further comprising a service provider portal communicating with the service order module of the expert system, the service provider portal having communication capabilities for transmitting the service orders to remote service provider equipments.

6. The system according to claim 5, wherein the service provider portal further has reception capabilities for receiving the responses to the service orders from the remote service provider equipments and forwarding the responses to the transactional component.

7. The system according to claim 1, wherein the inventory modules comprise tables and fields forming the inventory records characterizing the services and the associated equipments in the inventory.

8. The system according to claim 7, wherein the fields comprise field items directly updatable from the user interface.

9. The system according to claim 1, wherein the processor of the transaction component is capable of assigning status to the transactions and of blocking new transactions on the inventory records concerned by the transactions having a pending status until reception of the responses to the service orders corresponding to the transactions.

10. The system according to claim 1, wherein the service orders have predetermined fields directly editable through the user interface.

11. A computerized method for real-time maintaining an inventory of services and associated resources of a client company, comprising the steps of:
   Importing, using a processor, inventory data supplied by the client company as corresponding inventory records stored in a product database component indicative of the inventory of services and associated resources of the client company;

Inputting, using a processor, user transactions relative to the inventory of services and associated resources as reflected by the inventory records in the product database component; copying the inventory records concerned by the user transactions from the product database component into a transactional database component;

applying user requested changes indicated by the user transactions to the inventory records in the transactional database component to form new transactional records in the transactional database component;

evaluating, using a processor, the new transactional records against corresponding ones of the inventory records stored in the product database component to identify corresponding eventual changes to be made to the inventory records stored in the product database component;

generating service orders indicative of the eventual changes and placing the service orders before service resources concerned by the eventual changes; inputting responses supplied by the service resources to the service orders;

updating, using a processor, the inventory records in the product database component with the transactional records in the transactional database component as a function of the responses; and controllably reporting selected aspects related to the inventory records.

12. The computerized method according to claim 11, wherein the inventory data comprise billing data indicative of what the client company is being invoiced with respect to the inventory of services and associated resources, the computerized method further comprising the steps of:

cross-checking the billing data during importation against the inventory records stored in the product database component to identify possible billing errors; and reporting the billing errors for eventual billing reconciliation.

13. The computerized method according to claim 12, wherein the inventory records comprise service characterizing data for the services to which the client company has access, equipment characterizing data for equipments used in relation with the services, employee data indicative of human resources of the company, policy rule data indicative of policies and rules established by the client company with respect to usage of the services by the human resources, contract data indicative of contractual terms with service providers for the services, and account data with respect to service providers providing the services and cost centers billed for the services, the computerized method further comprising the steps of:

associating the equipment characterizing data with the account data based on the respective equipments provided by the service providers;

associating the service characterizing data with the account data based on the respective service providers providing the services and the respective cost centers billed for the services;

associating the employee data with the service characterizing data based on the respective human resources using the services;

associating the policy rule data with the service characterizing data based on the respective policies and rules applying to the services; and associating the contract data with the service characterizing data based on the respective contractual terms applying to the services as a function of the respective service providers providing the services.

14. The computerized method according to claim 13, further comprising the steps of:

analyzing the billing data with respect to the contract data and the policy rule data to optimize contract offerings for the services; and reporting possible contract optimizations for the services; and wherein the user transactions comprise user requested changes to the contract data of the services based on the possible contract optimizations.

15. The computerized method according to claim 13, further comprising the steps of:

detecting policy exceptions using the billing data with respect to the policy rule data; and reporting possible policy exceptions;

and wherein the user transactions comprise user requested changes to the inventory records causing the possible policy exceptions.

16. The computerized method according to claim 13, further comprising the steps of:

monitoring employee movements based on the billing data, the employee data and the service data indicative of the services allotted to the human resources; and reporting possible actions to take with respect to the services based on the employee movements;

and wherein the user transactions comprise user requested changes to the inventory records based on the possible actions to take.

17. The computerized method according to claim 11, further comprising the steps of:

producing history related data as a function of changes made to the inventory records; and storing the history related data in the product database component for backtracking use.

18. The computerized method according to claim 11, wherein the inventory records are formed of tables and fields characterizing the services and the associated equipments in the inventory.

19. The computerized method according to claim 11, further comprising the steps of:

assigning status to the transactions; and blocking new transactions on the inventory records concerned by the transactions having a pending status until reception of the responses to the service orders corresponding to the transactions.

* * * * *